US012584391B2

(12) United States Patent
Al-Taq et al.

(10) Patent No.: US 12,584,391 B2
(45) Date of Patent: Mar. 24, 2026

(54) METHODS AND SYSTEMS OF CLEAN-UP FOR A FRACTURING FLUID

(71) Applicants: SAUDI ARABIAN OIL COMPANY, Dhahran (SA); KING FAHD UNIVERSITY OF PETROLEUM & MINERALS, Dhahran (SA)

(72) Inventors: Ali Abdullah Al-Taq, Qatif (SA); Murtada Saleh Al-Jawad, Dhahran (SA); Sajjad Saeed Aldarweesh, Dhahran (SA); Hussain A. Abbas, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 226 days.

(21) Appl. No.: 18/588,616

(22) Filed: Feb. 27, 2024

(65) Prior Publication Data

US 2025/0270912 A1 Aug. 28, 2025

(51) Int. Cl.

| | |
|---|---|
| ***E21B 43/24*** | (2006.01) |
| ***B01F 23/41*** | (2022.01) |
| *B01F 101/49* | (2022.01) |

(52) U.S. Cl.

CPC ...... *E21B 43/2405* (2013.01); *B01F 23/4105* (2022.01); *B01F 23/4145* (2022.01); *B01F 2101/49* (2022.01)

(58) Field of Classification Search

CPC .............................. E21B 43/2405; C09K 8/38
USPC ........................................................ 166/272.1
See application file for complete search history.

(56) References Cited

U.S. PATENT DOCUMENTS

| | | | | |
|---|---|---|---|---|
| 10,933,381 | B1 * | 3/2021 | Bader | B01D 67/0016 |
| 2016/0244661 | A1 * | 8/2016 | Almubarak | C09K 8/845 |
| 2017/0130568 | A1 | 5/2017 | Al-Nakhli | |
| 2017/0349819 | A1 * | 12/2017 | Al-Nakhli | E21B 43/24 |
| 2019/0106614 | A1 * | 4/2019 | Sharma | C09K 8/36 |

(Continued)

OTHER PUBLICATIONS

Kurlenya, M.V. et al., "Froth Gel for Gas-Bearing Coal Bed Hydrofracturing in Mine Conditions." Journal of Mining Science, 2012, vol. 48, No. 6, pp. 947-953 (7 pages).

(Continued)

*Primary Examiner* — William D Hutton, Jr.
*Assistant Examiner* — Ashish K Varma
(74) *Attorney, Agent, or Firm* — Osha Bergman Watanabe & Burton LLP

(57) ABSTRACT

Methods and systems are disclosed herein. A method may include emulsifying a first emulsion, wherein the first emulsion includes a first aqueous phase, a first hydrocarbon phase, and a first surfactant. The method may include pumping the first emulsion into the subterranean region of interest. The method may include emulsifying a second emulsion, wherein the second emulsion includes a second aqueous phase, a second hydrocarbon phase, and a second surfactant. The method may include pumping the second emulsion into the subterranean region of interest after a pre-determined time, wherein heat and a gas are generated from a reaction of mixing the first emulsion and the second emulsion, wherein the first emulsion is destabilized by the heat of the reaction, and wherein the gas reduces hydrostatic pressure to facilitate flowback of the first emulsion.

20 Claims, 4 Drawing Sheets

(56) References Cited

U.S. PATENT DOCUMENTS

2020/0385626 A1* 12/2020 Ramasamy .............. C09K 8/36

OTHER PUBLICATIONS

Hassan, A. et al. "Fines migration and clay swelling during sandstone acidizing" Developments in Petroleum Science, Chapter 4.6, 2023 (1 page).

Zhang, L. et al. "A Systematic Study of Shear-Tolerant Micro-Emulsion Fracturing Fluid" Int J Petrochem Res. vol. 1, Issue 1, pp. 26-30 (5 pages).

Nguyen, D. A. et al. "Kinetics and mechanism of the reaction between ammonium and nitrite ions: experimental and theoretical studies" Chemical Engineering Science 58 (2003) 4351-4362 (12 pages).

* cited by examiner

METHODS AND SYSTEMS OF CLEAN-UP FOR A FRACTURING FLUID

BACKGROUND

Oil and gas production depend on many factors such as reservoir characteristics, fluid type (e.g., oil, condensate, and/or gas), source and fluid quality. These factors among others help in creating challenges during extraction of the fluids. For example, tight reservoirs (e.g., unconventional reservoirs with low permeability) may experience low production yields without reservoir stimulation. Reservoir stimulation may include hydraulic fracturing. Hydraulic fracturing includes injecting fracturing fluid into the reservoir to induce fracturing of the reservoir rock. The increased surface area of the reservoir rock allows higher production yields of the fluid from the reservoir.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some aspects, the techniques described herein relate to a method of fracturing fluid cleanup in a subterranean region of interest. The method of fracturing fluid cleanup may include, using a mixing system, emulsifying a first emulsion. The first emulsion may include a first aqueous phase, and a first hydrocarbon phase. The method of fracturing fluid cleanup may include pumping, using a hydraulic fracturing system, the first emulsion into the subterranean region of interest. The method of fracturing fluid cleanup may include, using the mixing system, emulsifying a second emulsion, wherein the second emulsion includes a second aqueous phase, a second hydrocarbon phase, and a second surfactant. The method of fracturing fluid cleanup may include pumping, using the hydraulic fracturing system, the second emulsion into the subterranean region of interest after a pre-determined time. Heat and a gas may be generated from a reaction of mixing of the first emulsion and the second emulsion. The first emulsion may be destabilized by the heat of the reaction, and the gas may reduce hydrostatic pressure to facilitate flowback of the first emulsion.

In some aspects, the techniques described herein relate to a system of fracturing fluid cleanup in a subterranean region of interest. The system of fracturing fluid cleanup includes a mixing system configured to emulsify a first emulsion, wherein the first emulsion includes a first aqueous phase and a first hydrocarbon phase. The mixing system may also be configured to emulsify a second emulsion, wherein the second emulsion includes a second aqueous phase. The system of fracturing fluid cleanup may include a hydraulic fracturing system operatively connected to the mixing system and configured to pump the first emulsion into the subterranean region of interest. The hydraulic fracturing system is also configured to pump the second emulsion into the subterranean region of interest after a pre-determined time. Heat and a gas may be generated from a reaction of mixing of the first emulsion and the second emulsion, wherein the first emulsion is destabilized by the heat of the reaction, and the gas reduces hydrostatic pressure to facilitate flowback of the first emulsion.

In some aspects, the techniques described herein relate to a system, wherein the pre-determined time is a day. Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
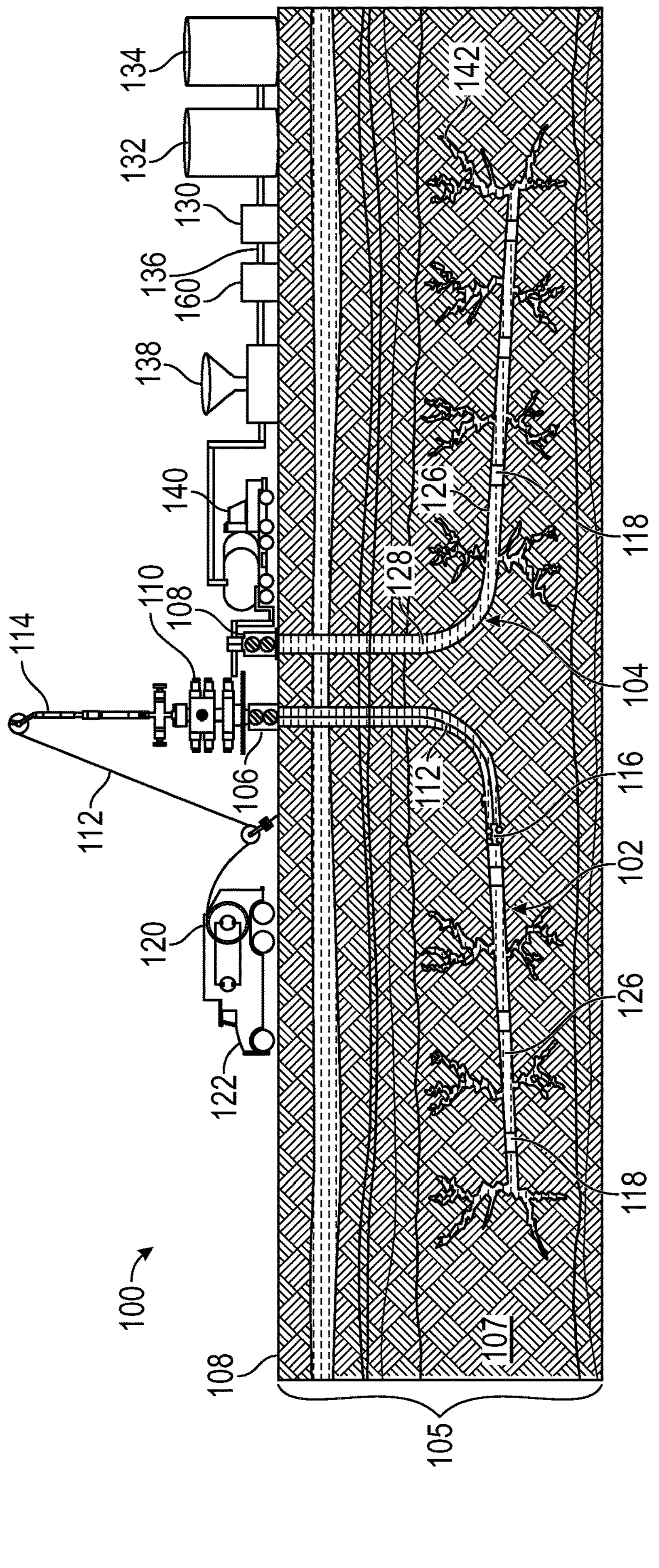
FIG. 1 illustrates a hydraulic fracturing system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

The present disclosure relates to a method and system of fracturing fluid cleanup in a subterranean region of interest that includes a first emulsion for fracturing purposes and a second emulsion for cleanup of the first emulsion used for fracturing. The system for fracturing fluid cleanup may include a mixing system configured to emulsify an emulsion. The first emulsion may be pumped into a reservoir using a hydraulic fracturing system. The first emulsion may include proppant to prop open fractures induced from the hydraulic fracturing and/or natural fractures. The second emulsion may be pumped into the reservoir using a hydraulic fracturing system. The second emulsion may form a reaction with the first emulsion as the first emulsion and the second emulsion mix within the reservoir. The reaction may generate heat. The heat that is generated from the reaction may break up the first emulsion by reducing the viscosity, potentially facilitating flowback of the fracturing fluid. The reaction may generate a gas such as nitrogen gas. The gas potentially reduces hydrostatic pressure, potentially facilitating flowback of the fracturing fluid.

FIG. 1 shows a schematic diagram in accordance with one or more embodiments. More specifically, FIG. 1 illustrates an example embodiment of a hydraulic fracturing system (100) that includes a hydrocarbon reservoir ("reservoir") (107) located in a subterranean region of interest (105) and a first well (102) and a second well (104). The subterranean region of interest (105) may include a porous or fractured rock formation that resides underground, beneath the earth's surface ("surface") (108). In some embodiments, the reservoir (107) may be an unconventional reservoir (e.g., a low permeability and/or low porosity reservoir). The subterranean region of interest (105) and the reservoir (107) may include different layers of rock having varying characteristics, such as varying degrees of permeability, porosity, capillary pressure, and resistivity. The reservoir (107) may include production fluids such as gas, oil, condensate, and/or brine water. In the case of the well being operated as a production well, the well may facilitate the extraction of hydrocarbons (or "production") from the reservoir (107).

FIG. 1 shows an example embodiment of a hydraulic fracturing system (100) undergoing a hydraulic fracturing operation in accordance with one or more embodiments. The particular hydraulic fracturing operation and hydraulic fracturing system (100) shown is for illustration purposes only. The scope of this disclosure is intended to encompass any type of hydraulic fracturing system (100) and hydraulic fracturing operation. In general, a hydraulic fracturing operation includes two separate operations: a perforation operation and a pumping operation. As such, FIG. 1 shows a hydraulic fracturing operation occurring on the first well (102) and the second well (104). The first well (102) is undergoing the perforation operation and the second well (104) is undergoing the pumping operation.

The first well (102) and the second well (104) are horizontal wells meaning that each well includes a vertical section and a lateral section. The lateral section is a section of the well that is drilled at least eighty degrees from vertical. The first well (102) is capped by a first frac tree (106) and the second well (104) is capped by a second frac tree (108). A frac tree (106, 108) is similar to a Christmas/production tree but is specifically installed for the hydraulic fracturing operation. Frac trees (106, 108) tend to have larger bores and higher-pressure ratings than a Christmas/production tree would have. Further, hydraulic fracturing operations require abrasive materials being pumped into the well at high pressures, so the frac tree (106, 108) is designed to handle a higher rate of erosion.

In accordance with one or more embodiments, a wireline is configured to maneuver wireline tools such as a perforation gun in a well. The wireline is configured to transmit messages from the wireline tools to a wireline truck (122). The wireline truck includes a wireline spool (120) that is configured to manipulate the length of a wireline (112). The perforating operation includes installing a wireline blow out preventor (BOP) (110) onto the first frac tree (106). A wireline BOP (110) is similar to a drilling BOP; however, a wireline BOP (110) has seals designed to close around (or shear) wireline (112) rather than drill pipe. A lubricator (114) is connected to the opposite end of the wireline BOP (110). A lubricator (114) is a long, high-pressure pipe used to equalize downhole pressure and atmosphere pressure in order to run downhole tools, such as a perforating gun (116), into the well.

When the perforating gun (116) reaches a pre-determined depth, a message is sent along the wireline (112) to set the frac plug (118). After the frac plug (118) is set, another message is sent through the wireline (112) to detonate the explosives, as shown in FIG. 1. The explosives create perforations in the casing (126) and in the subterranean region of interest (105). There may be more than one set of explosives on a singular perforation gun (116), each detonated by a distinct message. Multiple sets of explosives are used to perforate different depths along the casing (126) for a singular stage. Further, the frac plug (118) may be set separately from the perforation operation without departing from the scope of the disclosure herein.

As explained above, FIG. 1 shows the second well (104) undergoing the pumping operation after the fourth stage perforating operation has already been performed and perforations are left behind in the casing (126) and the subterranean region of interest (105). A pumping operation includes pumping a frac fluid (128) into the perforations in order to propagate the perforations and create fractures (142) in the subterranean region of interest (105). The frac fluid (128) often includes a certain percentage of water, proppant, and chemicals. In some embodiments, the frac fluid (128) may include an emulsion.

FIG. 1 also shows chemical storage containers (130), water storage containers (132), a mixing system (160), and proppant storage containers (134) located on the hydraulic fracturing system (100). Frac lines (136) and transport belts (not pictured) transport the chemicals, proppant, and water from the storage containers (130, 132, 134) into a frac blender (138). The frac blender (138) blends the water and/or emulsion, chemicals, and proppant to become the frac fluid (128). The frac fluid (128) is transported to one or more frac pumps, often pump trucks (140), to be pumped through the second frac tree (108) into the second well (104). The frac fluid (128) is transported from the pump truck (140) to the second frac tree (108) using a plurality of frac lines (136). The fluid pressure propagates and creates the fractures (142) while the proppant props open the fractures (142) once the pressure is released.

Figure 2A:
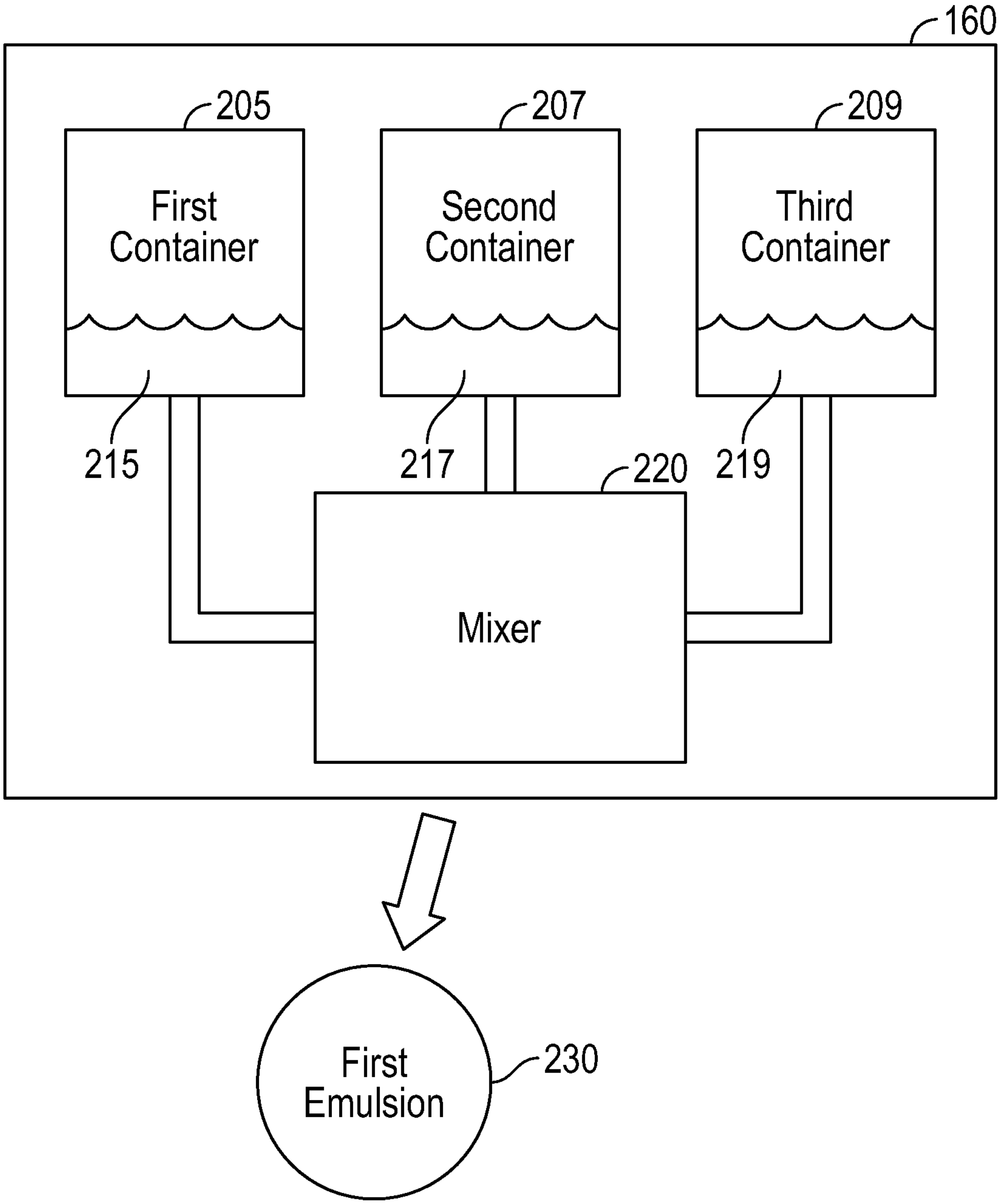
FIG. 2A illustrates a mixing system in accordance with one or more embodiments.
Figure 2B:
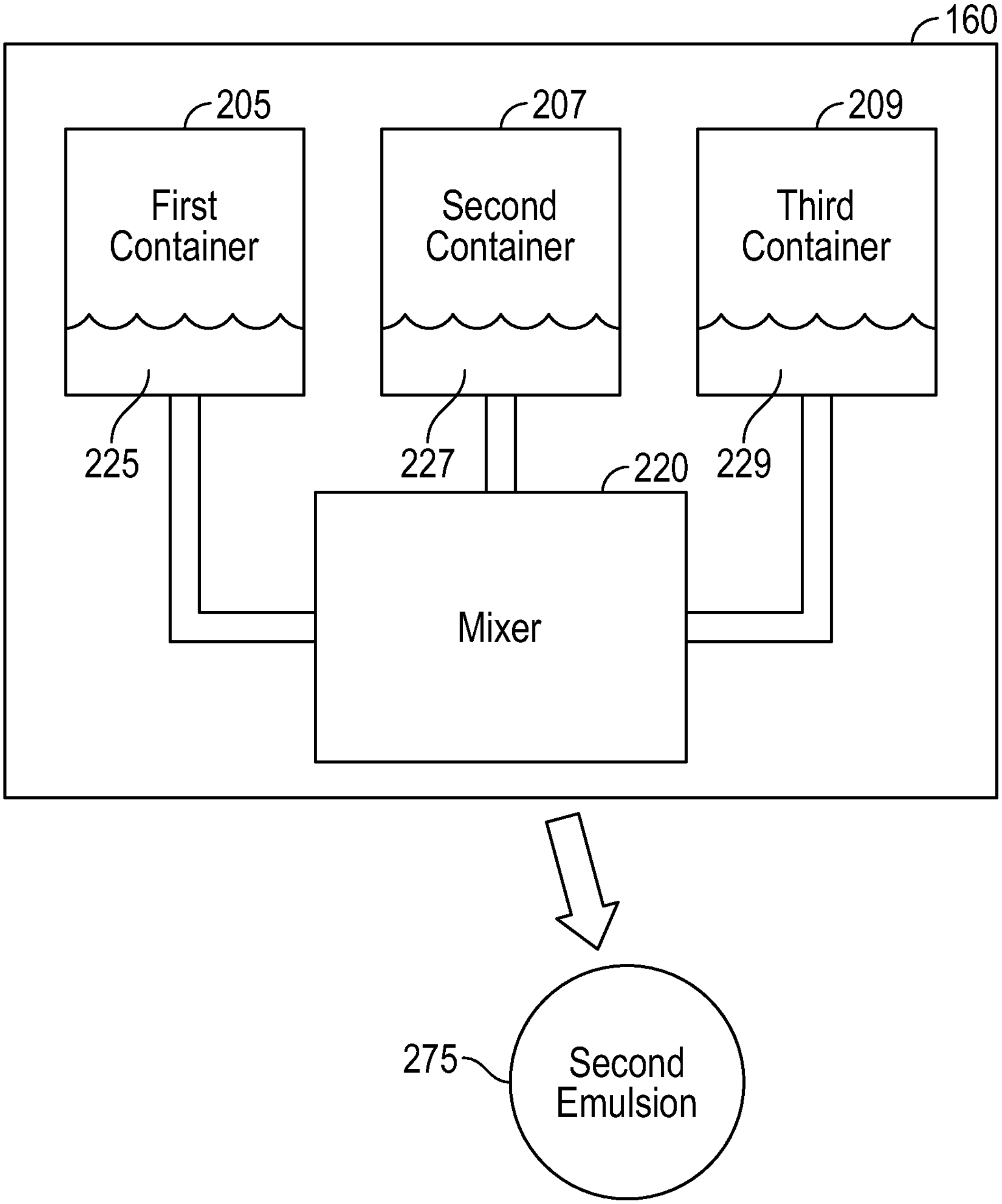
FIG. 2B illustrates a mixing system in accordance with one or more embodiments.

FIGS. 2A and 2B show the mixing system (160) configured to emulsify an emulsion in accordance with one or more embodiments. The mixing system (160) may include a first container (205) having an aqueous phase and a second container (207) having a hydrocarbon phase. The aqueous phase may include a quantity of water and a quantity of salt (e.g., ammonium chloride and/or sodium nitrite). In some embodiments, the concentration of the quantity of salt within the aqueous phase may be between 3-5 molarity (M). The volume percent of the aqueous phase may be between 60-70% of the total volume of the emulsion. The hydrocarbon phase may include, but is not limited to, diesel, kerosene, toluene, and/or xylene. The volume percent of the hydrocarbon phase may be between 25-30% of the total volume of the emulsion.

In some embodiments, the mixing system (160) may include a mixer (220) configured to emulsify the aqueous phase and the hydrocarbon phase to form the emulsion. The mixer (220) may include hardware and/or software for emulsifying, combining and/or mixing the aqueous phase and the hydrocarbon phase. While FIGS. 1, 2A, and 2B may show only one mixing system and emulsion, it should be obvious to a person having skill in the art that the invention may employ more than one mixing system and emulsion.

In some embodiments, the mixing system (160) may include a third container (209) having a surfactant. The surfactant may include a compound such as an emulsifier. The compound may include a first group having a quantity of hydrophilic material and a second group having a quantity of hydrophobic material. The volume percent of the surfactant to total volume may be between 1-5%. The surfactant may be configured to be absorbed at the interface of the aqueous phase and the hydrocarbon phase. The surfactant may stabilize the emulsion from separating. Separating may occur if the hydrocarbon phase coalesces. The emulsifier may include, but is not limited to, polymer emulsifiers, fatty acids, fatty alcohols, ethoxylates, and/or glycerol. For example, the emulsifier may be a nonionic emulsifier. The nonionic emulsifier may be used in any rock formation. In another example embodiment, the emulsifier may be a cationic emulsifier. The cationic emulsifier may be used for fracturing a carbonate formation. In another example, the emulsifier may be an anionic emulsifier used in fracturing a sandstone formation. In some embodiments, the emulsifier may include a cosurfactant. The cosurfactant may include, but is not limited to, resins, amines, epoxides, polyols, and/or polymers. The cosurfactant is configured to increase the stability of an emulsion. However, fatty acids should be excluded as an emulsifier in an emulsion if the salt in the aqueous phase is sodium nitrite, as fatty acids will react to form nitrogen oxides (i.e., a mixture or nitrogen oxide and nitrogen dioxide)

In some embodiments, the emulsion may include a biocide. The biocide may be configured to inhibit microbial degradation of the emulsion and/or hydrocarbons within the well and the reservoir (107). In some embodiments, the biocide may be added into the mixer (220) during the emulsification of the emulsion. In some embodiments, the biocide may be added into the frac blender (138).

In some embodiments, the emulsion may include a viscosifier such as, but is not limited to, clay-based viscosifiers and polymer viscosifiers. The viscosifier is configured to add viscosity to the emulsion. The viscosifier may facilitate the transport of proppant with the frac fluid (128). The viscosifier may affect fracture geometry. In some embodiments, clay-based viscosifiers may include, but are not limited to, bentonite and attapulgite. Polymer viscosifiers may include, but are not limited to, guar gum, xanthan gum, polyacrylamides, and cellulose polymers. In some embodiments, the biocide may be added into the mixer (220) during the emulsification of the emulsion.

In some embodiments, the aqueous phase and hydrocarbon phase may be emulsified to form a microemulsion. A microemulsion may include the hydrocarbon phase in droplets with diameters between 1 to 100 nm. The mixer (220) may be configured to emulsify the aqueous phase and the hydrocarbon phase to form a microemulsion.

In accordance with one or more embodiments, the system for cleanup of a fracturing fluid (hereafter "cleanup system") includes a mixing system similar to or the same as described in FIGS. 2A and 2B and accompanying description. The mixing system (160) may be configured to emulsify a first emulsion (230) as shown in FIG. 2A. The first emulsion (230) may include a first aqueous phase (215) and a first hydrocarbon phase (217). In some embodiments, the first emulsion (230) may include a first surfactant (219). The first aqueous phase (215) is between 60-70 volume percent (vol %) of the total volume. The first hydrocarbon phase (217) may be between 25-30 vol %. The first aqueous solution includes a first quantity of water and a quantity of ammonium chloride (i.e., $NH_4Cl$). The quantity of ammonium chloride is between 3-5 molarity (M) for the first aqueous phase (215). In some embodiments, the first emulsion (230) may include a first quantity of polymer. The first quantity of polymer may include a first quantity of guar gum polymer. In some embodiments, the first emulsion (230) includes a first quantity of biocide. The first quantity of biocide may be between 1-5 vol %.

In accordance with one or more embodiments, the mixing system (160) may also be configured to emulsify a second emulsion (275) as shown in FIG. 2B. The second emulsion (275) includes a second aqueous phase (225). In some embodiments, the second emulsion (275) may include a second hydrocarbon phase (227), and a second surfactant (229). The second aqueous phase (225) may be between 60-70 vol %. The second hydrocarbon phase (227) may be between 25-30 vol %. The second aqueous phase (225) includes a second quantity of water and a quantity of sodium nitrite (i.e., NaNO2). The quantity of sodium nitrite is between 3-5 molarity (M) for the second aqueous phase (225). In some embodiments, the second emulsion (275) may include a second quantity of polymer. The second quantity of polymer may include a second quantity of guar gum polymer. In some embodiments, the second emulsion (275) includes a second quantity of biocide. The second quantity of biocide may be between 1-5 vol %.

In accordance with one or more embodiments, the cleanup system may include a hydraulic fracturing system similar to or the same as the hydraulic fracturing system (100) as described in FIG. 1 and accompanying description. The hydraulic fracturing system (100) may be configured to pump the first emulsion (230) into the subterranean region of interest (105). The first emulsion (230) may not have a reaction with production fluids within the subterranean region of interest (105). The first emulsion (230) may hydraulically fracture the subterranean region of interest (105). The first emulsion (230) may include proppant to prop open fractures.

In accordance with one or more embodiments, the hydraulic fracturing system (100) may be configured to pump the second emulsion (275) into the subterranean region of interest (105). The second emulsion (275) may be pumped in the subterranean region of interest (105) after a pre-determined time (e.g., a day). The second emulsion (275) may not have a reaction with production fluids within the subterranean region of interest (105). The second emulsion (275) may mix with the first emulsion (230) within the subterranean region of interest (105). The first emulsion (230) and the second emulsion (275) may form a reaction. The reaction may generate one or more by-products. The one or more by-products may include heat and/or a gas. The reaction may take the form:

$$NaNO_2 + NH_4Cl \rightarrow NaCl + H_2O + N_2 \quad (1)$$

where the gas generated may include nitrogen gas ($N_2$). The heat generated may be about −79.95 kcal per mole at 25 degrees Celsius. The temperature within the reservoir (107) may reach up to 600 degrees Fahrenheit.

In some embodiments, the reaction may take time for the reaction to occur as the first aqueous phase (215) and the second aqueous phase (225) mix. The first emulsion (230) and the second emulsion (275) may break over time, thereby allowing the first aqueous phase (215) and the second aqueous phase (225) to mix. The time to allow the emulsions to break would allow the second emulsion (275) to penetrate deep into the subterranean region of interest (105) to allow the reaction to occur over a broader volume of rock within the subterranean region of interest (105). The broader volume of rock will allow more frac fluid (128), such as the first emulsion (230), to flowback using the hydraulic fracturing system (100).

In accordance with one or more embodiments, the first emulsion (230) may be destabilized due to the heat of the reaction. In some embodiments, the destabilization of the first emulsion (230) may facilitate the flowback of the first emulsion (230) using the hydraulic fracturing system (100). Other factors in determining time for the first emulsion to break may include downhole temperature, pH of the thermochemical fluids ($NH_4Cl$ and $NaNO_2$) and emulsion stability.

In accordance with one or more embodiments, the gas generated from the reaction may reduce hydrostatic pressure within the subterranean region of interest (105). In some embodiments, the reduction of hydrostatic pressure may facilitate flowback of the first emulsion (230) using the hydraulic fracturing system (100).

Figure 3:
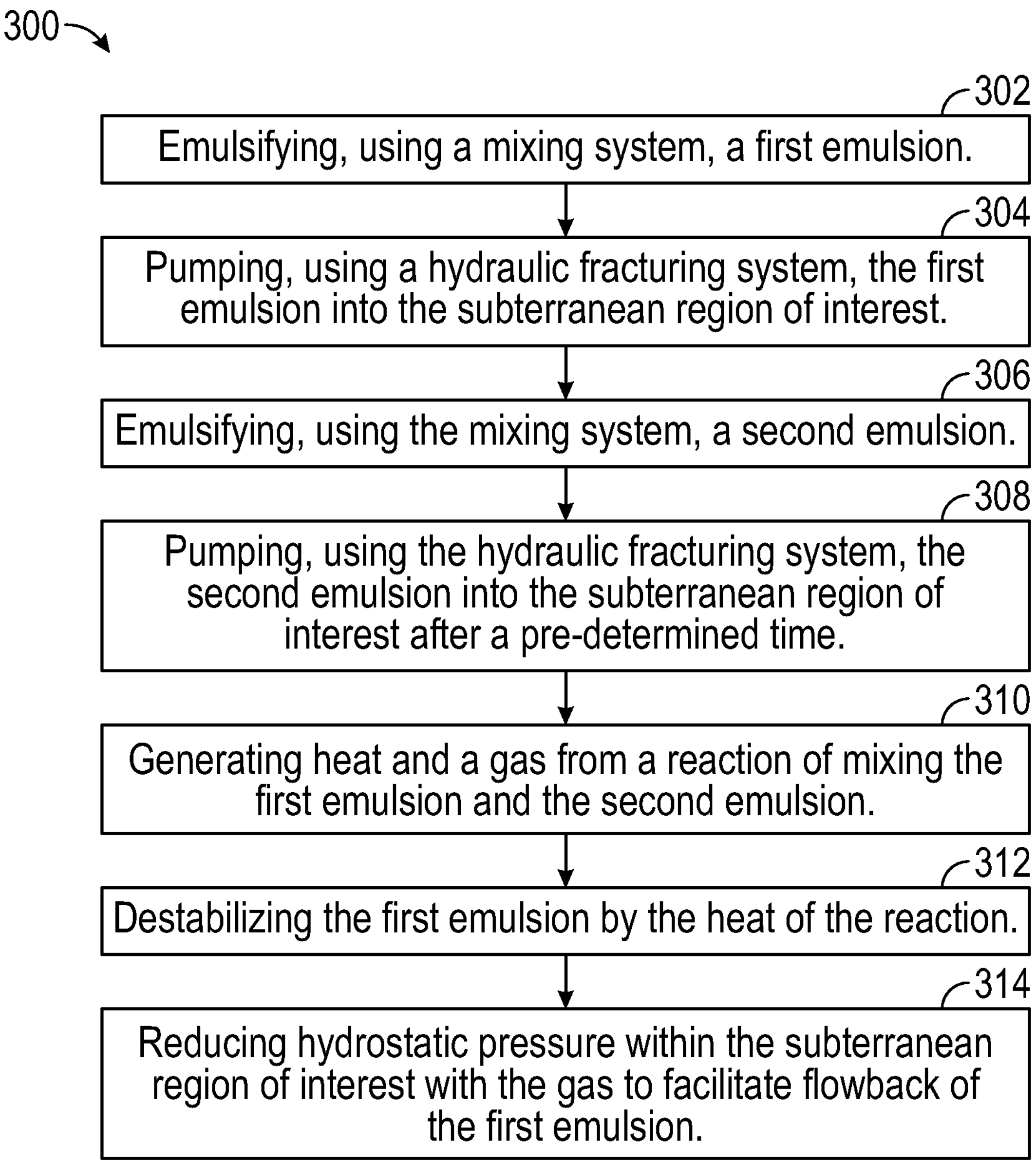
FIG. 3 shows a flowchart for a method in accordance with one or more embodiments.

FIG. 3 shows a flowchart in accordance with one or more embodiments describing a method of fracturing fluid cleanup in a subterranean region of interest (hereafter "cleanup method") (300). Although the steps in the flowchart using the cleanup method (300) are shown in sequential order, it will be apparent to one of ordinary skill in the art that some steps may be conducted in parallel, in a different order than shown, or may be omitted without departing form the scope of the invention.

Initially, in step (302), the cleanup method includes emulsifying the first emulsion (230) using the mixing system (160) in some embodiments. The first aqueous phase (215), the first hydrocarbon phase (217), and the first surfactant (219) may be emulsified to form the first emulsion (230). In some embodiments, the first quantity of viscosifier and/or the first quantity of biocide may be mixed into the first emulsion (230) using the mixing system (160) or the frac blender (138).

In step (304), the first emulsion (230) is pumped into the subterranean region of interest (105) using the hydraulic fracturing system (100). The first emulsion (230) may be used for hydraulic fracturing of the reservoir (107) within the subterranean region of interest (105). In some embodiments, proppant, chemicals, and/or water may be mixed with the first emulsion (230) using the frac blender (138).

In step (306), the cleanup method includes emulsifying the second emulsion (275) using the mixing system (160) in some embodiments. The second aqueous phase (225), the second hydrocarbon phase (227), and the second surfactant (229) may be emulsified to form the second emulsion (275). In some embodiments, the second quantity of viscosifier and/or the second quantity of biocide may be mixed into the first emulsion (230) using the mixing system (160) or the frac blender (138).

In step (308), the second emulsion (275) is pumped into the subterranean region of interest (105) after a pre-determined time. The pre-determined time may include an interval of time suitable for the fracturing of the reservoir (107) within the subterranean region of interest (e.g., a day). The breaking of the first emulsion (230) and the second emulsion (275) may facilitate mixing of the first emulsion (230) and the second emulsion (275). In some embodiments, each of the first emulsion (230) and the second emulsion (275) may break (i.e., demulsify into the aqueous phase and the hydrocarbon phase), at least in part. In some embodiments, the first emulsion (230) and the second emulsion (275) may mix, at least in part, together forming a mixture. The mixing of the first emulsion (230) and the second emulsion (275) may form a reaction. In some embodiments, the second emulsion (275) may include a demulsifier configured to disrupt surfactants and further destabilize or break the first emulsion (230), thereby, enabling the first aqueous phase (215) and the first hydrocarbon phase (217) of the first emulsion (230) to coalesce. In some embodiments, the first emulsion (230) and the second emulsion (275) may be pumped, using the hydraulic fracturing system (100), into the subterranean region of interest simultaneously. In some embodiments, pumping the first emulsion (230) and the second emulsion (275) into the subterranean region of interest (105) simultaneously may generate fractures (142) in the subterranean region of interest (105). In some embodiments, the size of the fractures (142) generated from pumping the first emulsion (230) and the second emulsion (275) into the subterranean region of interest (105) simultaneously may be larger in size relative to the fractures (142) generated from only pumping the first emulsion (230).

In step (310), the cleanup method includes generating heat and the gas from the reaction of mixing the first emulsion (230) and the second emulsion (275). The gas generated from the reaction may include nitrogen gas. The gas may mix, at least in part, with the production fluids, frac fluid (128), the first emulsion (230), the second emulsion (275), and/or the mixture within the subterranean region of interest (105).

In step (312), the first emulsion (230) is destabilized by the heat of the reaction. That is, the first emulsion (230) may not fully break. The heat generated from the reaction of mixing the first emulsion (230) and the second emulsion (275) may destabilize the first emulsion (230) that did not already break. The destabilization of the first emulsion (230) may facilitate flowback of the first emulsion (230) thereby cleaning more of the first emulsion (230) from the subterranean region of interest (105).

In step (314), the cleanup method includes reducing the hydrostatic pressure within the subterranean region of interest (105) with the gas to facilitate flowback of the first emulsion (230). That is, the generation of nitrogen gas reduces the well hydrostatic pressure and thus provides better cleanup. In some embodiments, the mixing of the gas with the production fluids, frac fluid (128), the first emulsion (230), the second emulsion (275), and/or mixture may reduce the hydrostatic pressure of the fluids. The reduction of the hydrostatic pressure may facilitate flowback of the fluids including the first emulsion (230). The flowback of the fluids cleans, at least in part, the reservoir (107) of these fluids. The flowback of the fluids may provide the advantage of potentially improved production rates from the reservoir (107).

Embodiments of the present disclosure may provide at least one of the following advantages. The reaction of the first emulsion and the second emulsion may help break the first emulsion. The first emulsion may flowback at relatively higher volumes and be recovered by the hydraulic fracturing system (100). The higher recovery volume may allow for relatively higher production rates as the reservoir (107) may have relatively improved permeability due to less of the first emulsion in pore space.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of fracturing fluid cleanup in a subterranean region of interest, the method comprising:
- emulsifying, using a mixing system, a first emulsion,
  - wherein the first emulsion comprises:
    - a first aqueous phase,
    - a first hydrocarbon phase;
- pumping, using a hydraulic fracturing system, the first emulsion into the subterranean region of interest;
- emulsifying, using the mixing system, a second emulsion,
  - wherein the second emulsion comprises:
    - a second aqueous phase;
- pumping, using the hydraulic fracturing system, the second emulsion into the subterranean region of interest after a pre-determined time,
- wherein heat and a gas are generated from a reaction of mixing of the first emulsion and the second emulsion,
- wherein the first emulsion is destabilized by the heat of the reaction, and
- wherein the gas reduces hydrostatic pressure to facilitate flowback of the first emulsion.

2. The method of claim 1,
wherein the first hydrocarbon phase is between 25-30 volume percent (vol %),
wherein the first aqueous phase is between 60-70 vol %.

3. The method of claim 1,
wherein the first aqueous phase comprises:
a first quantity of water;
a quantity of ammonium chloride;
wherein the quantity of ammonium chloride is between 3-5 molarity (M) of the first aqueous phase.

4. The method of claim 1,
wherein the second aqueous phase comprises:
a second quantity of water;
a quantity of sodium nitrite;
wherein the quantity of sodium nitrite is between 3-5 M of the second aqueous phase.

5. The method of claim 1,
wherein the first emulsion further comprises a first quantity of polymer.

6. The method of claim 5,
wherein the first quantity of polymer comprises a first quantity of guar gum polymer.

7. The method of claim 1,
wherein the second emulsion further comprises a demulsifier,
wherein the first emulsion is further destabilized by the demulsifier.

8. The method of claim 1,
wherein the first emulsion further comprises a first quantity of biocide,
wherein the first quantity of biocide is between 1-5 vol %.

9. The method of claim 1,
wherein the pre-determined time is a day.

10. The method of claim 1, further comprises:
pumping, using the hydraulic fracturing system, the first emulsion and the second emulsion simultaneously,
wherein fractures are generated within the subterranean region of interest.

11. A system of fracturing fluid cleanup in a subterranean region of interest, the system comprising:
- a mixing system configured to:
  - emulsify a first emulsion,
    - wherein the first emulsion comprises:
      - a first aqueous phase,
      - a first hydrocarbon phase, and
      - a first surfactant; and
  - emulsify a second emulsion,
    - wherein the second emulsion comprises:
      - a second aqueous phase,
      - a second hydrocarbon phase, and
      - a second surfactant; and
- a hydraulic fracturing system operatively connected to the mixing system and configured to:
  - pump the first emulsion into the subterranean region of interest; and
  - pump the second emulsion into the subterranean region of interest after a pre-determined time,
  - wherein heat and a gas are generated from a reaction of mixing of the first emulsion and the second emulsion,
  - wherein the first emulsion is destabilized by the heat of the reaction, and
  - wherein the gas reduces hydrostatic pressure to facilitate flowback of the first emulsion.

12. The system of claim 11,
wherein the first hydrocarbon phase is between 25-30 volume percent (vol %),
wherein the first aqueous phase is between 60-70 vol %.

13. The system of claim 11,
wherein the first aqueous phase comprises:
a first quantity of water;
a quantity of ammonium chloride;
wherein the quantity of ammonium chloride is between 3-5 molarity (M) of the first aqueous phase.

14. The system of claim 11,
wherein the second aqueous phase comprises:
a second quantity of water;
a quantity of sodium nitrite;
wherein the quantity of sodium nitrite is between 3-5 M of the second aqueous phase.

15. The system of claim 11,
wherein the first emulsion further comprises a first quantity of polymer.

16. The system of claim 15,
wherein the first quantity of polymer comprises a first quantity of guar gum polymer.

17. The system of claim 11, wherein the second emulsion further comprises a demulsifier, wherein the first emulsion is further destabilized by the demulsifier.

18. The system of claim 11, wherein the first emulsion further comprises a first quantity of biocide, wherein the first quantity of biocide is between 1-5 vol %.

19. The system of claim 11, wherein the pre-determined time is a day.

20. The system of claim 11, wherein the hydraulic fracturing system is configured to pump the first emulsion and the second emulsion simultaneously, wherein fractures are generated within the subterranean region of interest.

* * * * *